June 2, 1959  G. P. NIESEN ET AL  2,888,874
SINGLE CYCLE CLUTCH MECHANISM FOR DUPLICATORS
Filed May 2, 1957  8 Sheets-Sheet 1

INVENTORS.
George P. Niesen
Anthony J. Mazzio
Edgar H. DuBois
By Ooms, McDougall,
Williams & Hersh Attorneys

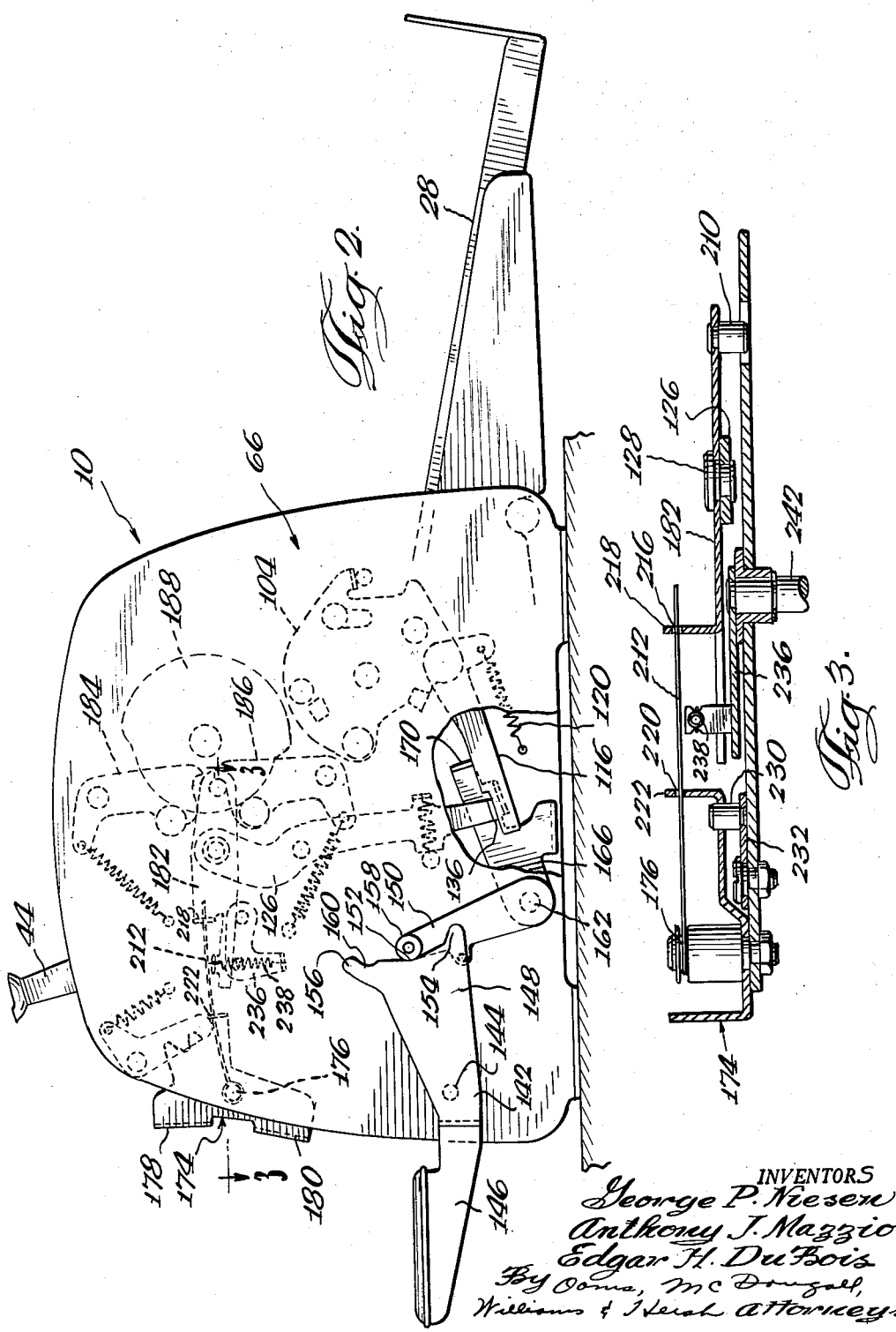

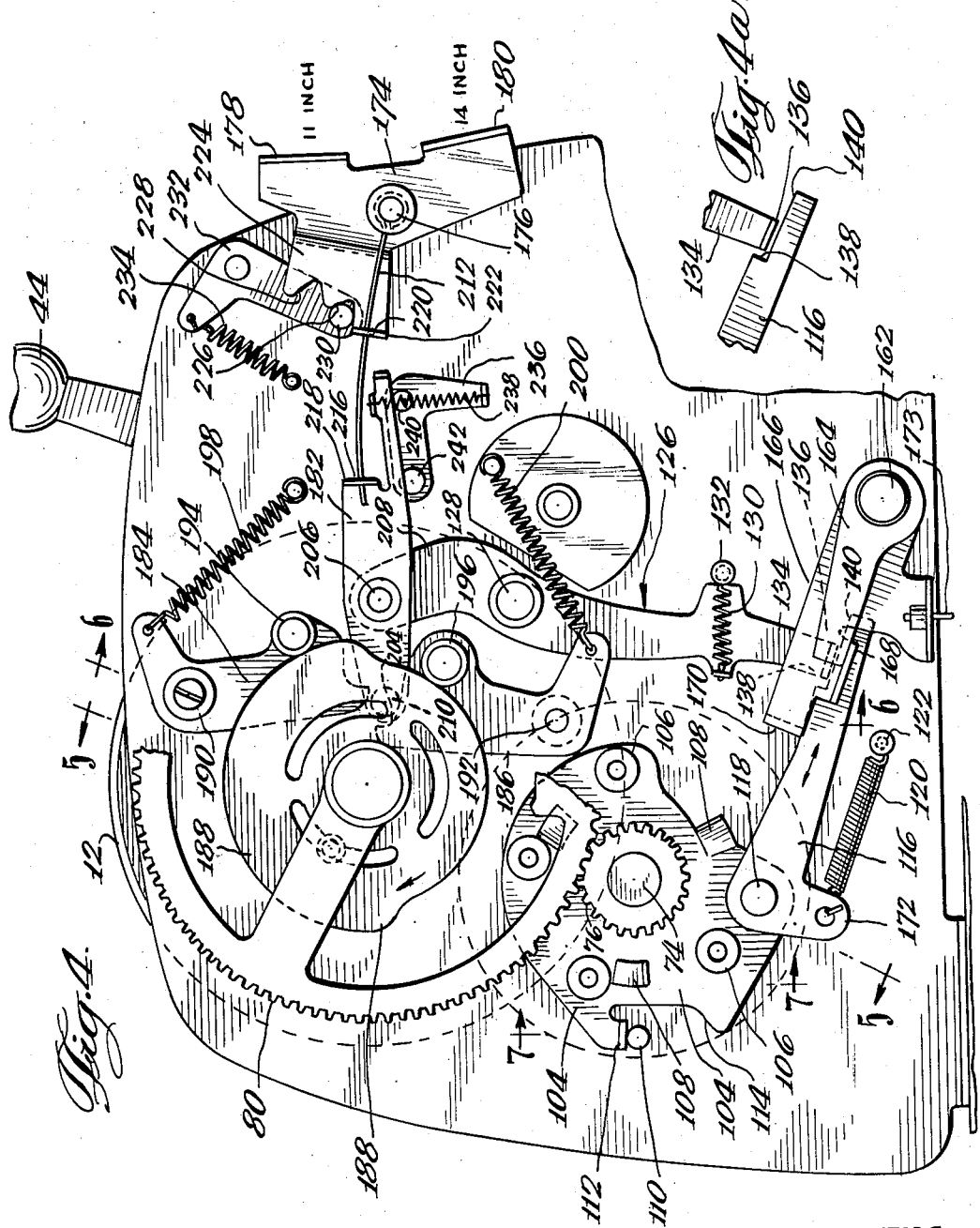

June 2, 1959  G. P. NIESEN ET AL  2,888,874
SINGLE CYCLE CLUTCH MECHANISM FOR DUPLICATORS
Filed May 2, 1957  8 Sheets-Sheet 4
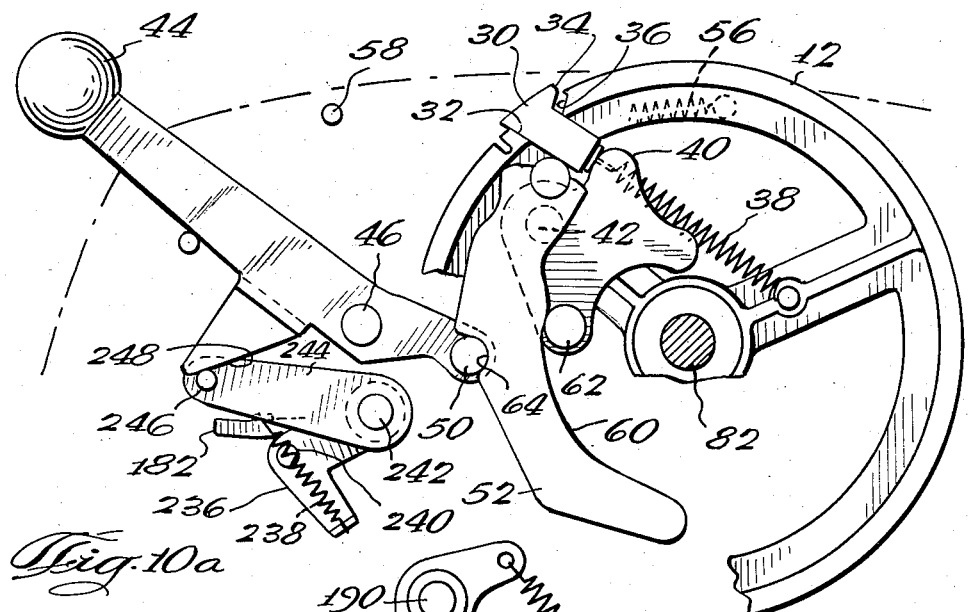
Fig. 10a
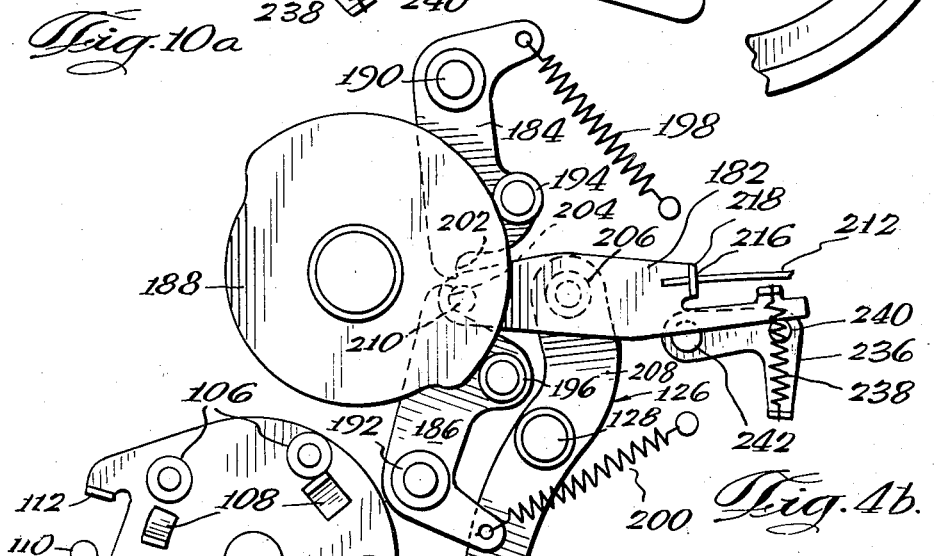
Fig. 4b.
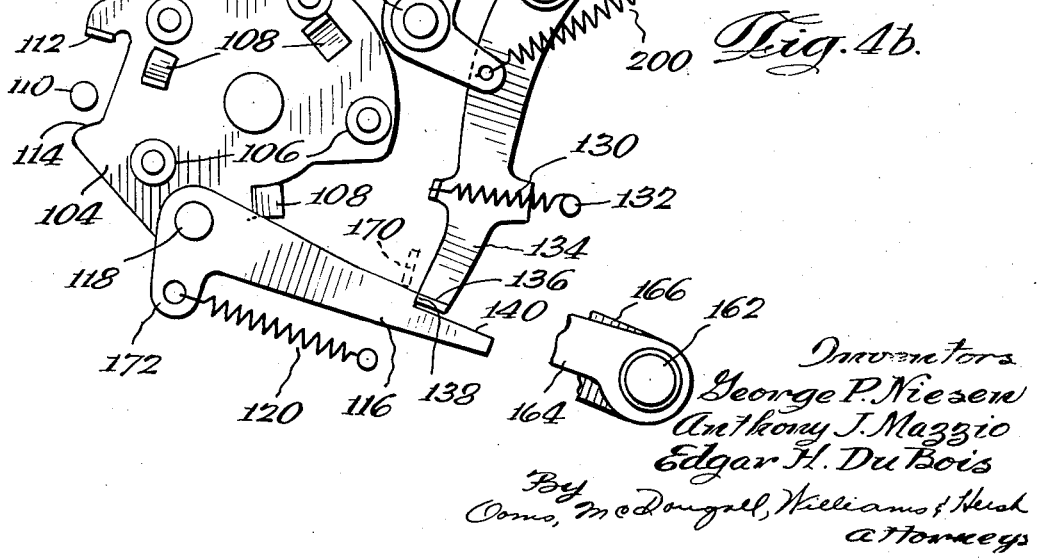
Inventors
George P. Niesen
Anthony J. Mazzio
Edgar H. DuBois
By Cono, McDougall, Williams & Hersh
Attorneys

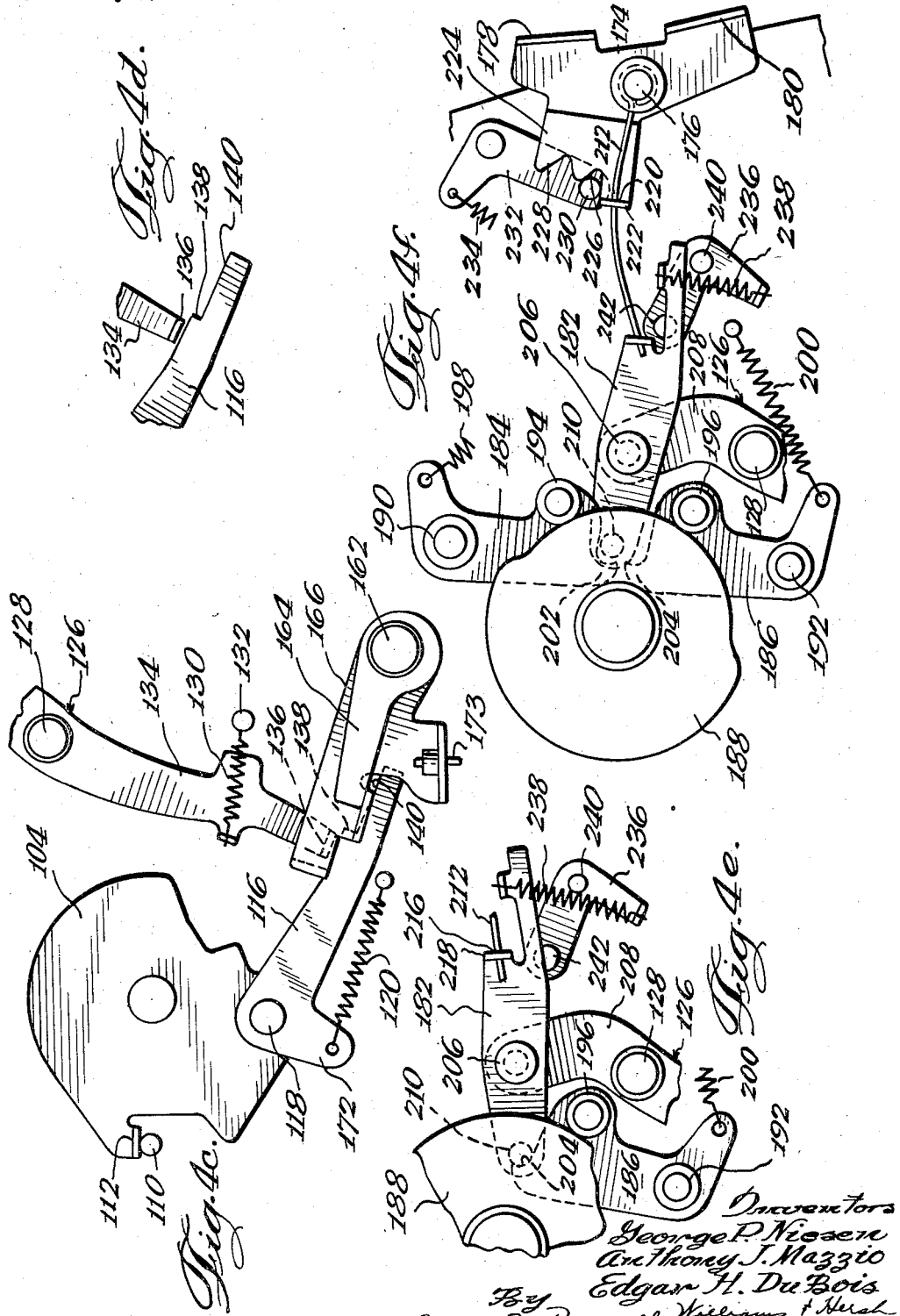

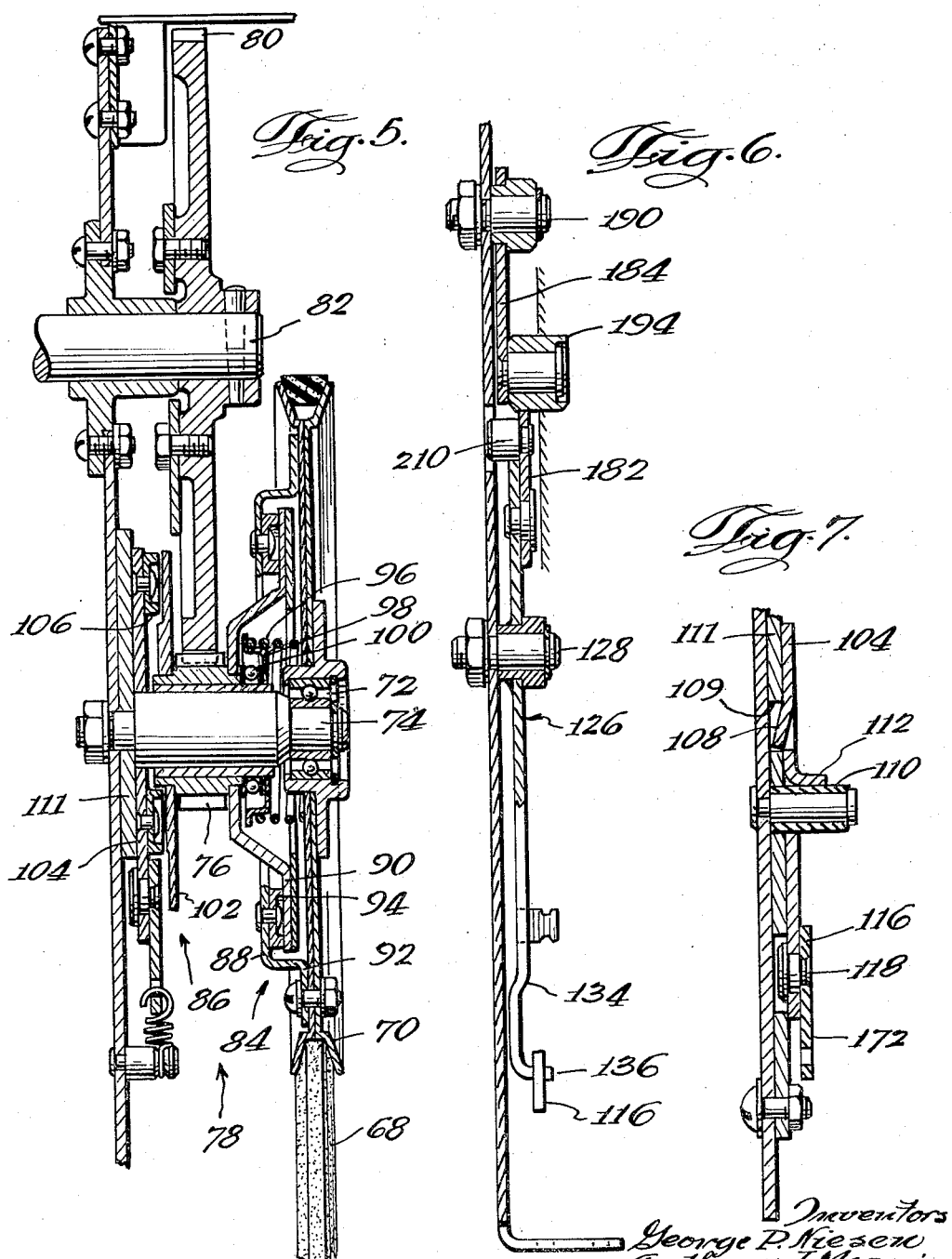

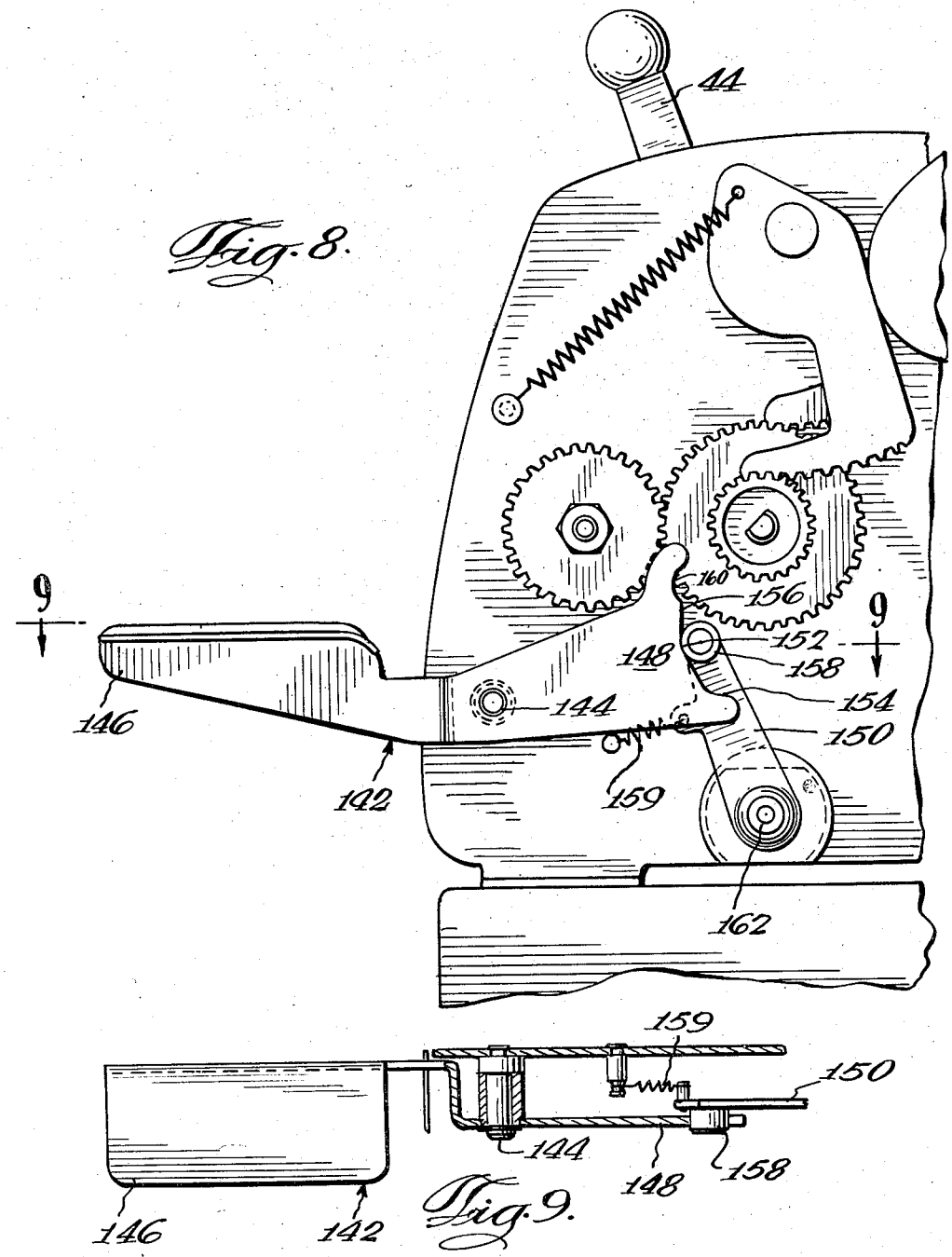

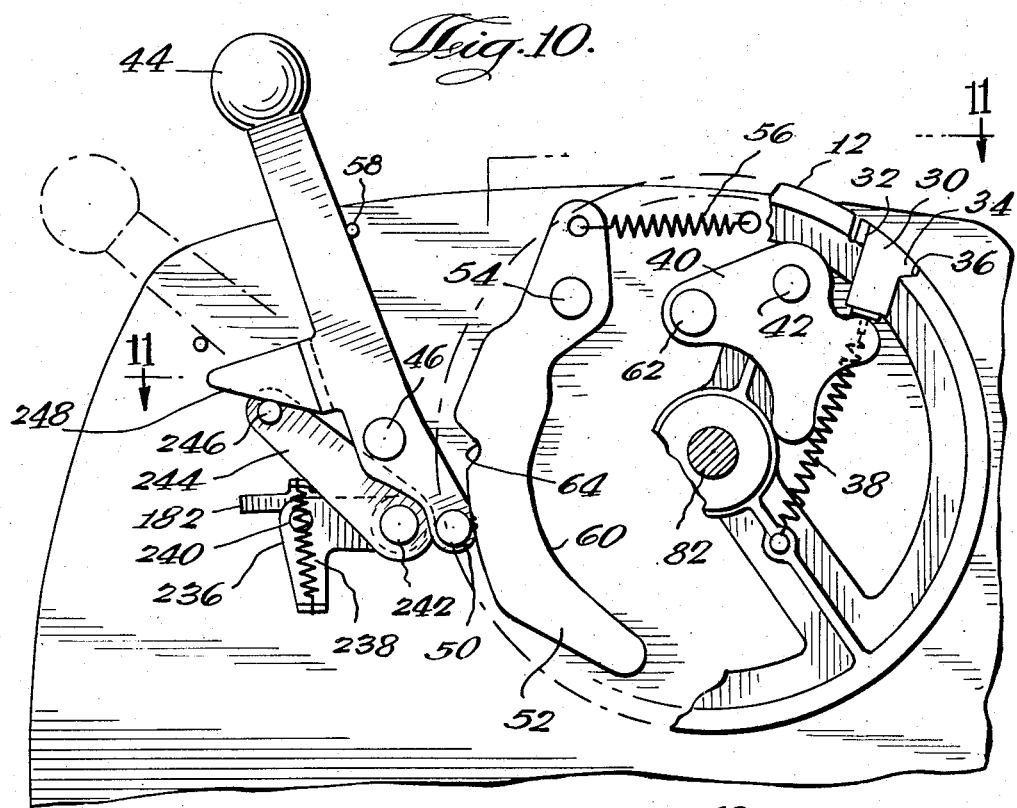
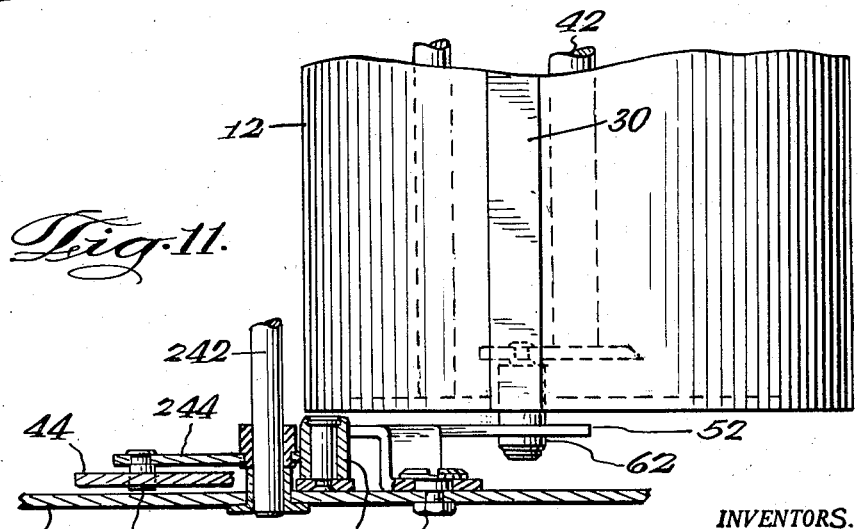

United States Patent Office 2,888,874
Patented June 2, 1959

2,888,874

SINGLE CYCLE CLUTCH MECHANISM FOR DUPLICATORS

George P. Niesen, Niles, and Anthony J. Mazzio and Edgar H. Du Bois, Chicago, Ill., assignors to A. B. Dick Company, Chicago, Ill., a corporation of Illinois Application May 2, 1957, Serial No. 656,718

8 Claims. (Cl. 101—132.5)

This invention relates to duplicators or other printing machines, and pertains particularly to single cycle clutch mechanisms for driving such duplicators.

One object of the present invention is to provide a new and improved single cycle clutch mechanism which will rotate the master cylinder of a duplicator through a single revolution so as to print a single sheet.

A further object is to provide such a new and improved single cycle clutch mechanism which is selectively operable to stop the cylinder in either of two positions, for use with either long or short master sheets.

Another object is to provide a new and improved duplicator having a master cylinder with a manually operable master clamp, together with a single cycle clutch mechanism which is tied in with the master clamp operating mechanism so that the clutch mechanism will automatically stop the master cylinder in a position with the clamp accessible, when the master clamp operating mechanism is set to open the clamp.

A further object is to provide a new and improved single cycle clutch mechanism which is selectively operable to rotate the master cylinder either continuously or through a single revolution.

Further objects and advantages of the present invention will appear from the following description, taken with the accompanying drawings in which:

Fig. 2 is a view similar to Fig. 1 with parts removed to show various details of the single cycle driving mechanism.

Fig. 3 is a fragmentary enlarged sectional view taken generally along a line 3—3 in Fig. 2.

Fig. 4 is a somewhat diagrammatic left-hand side elevational view of the duplicator with parts removed and broken away, the mechanism of the duplicator being shown in a position corresponding to an intermediate point of the cycle.

Fig. 4a is a view constituting a fragment of Fig. 4 with additional parts removed and broken away to illustrate a detail.

Fig. 4b is a view similar to Fig. 4, but showing the mechanism of the duplicator in a changed position, occupied when the cylinder of the duplicator is stopped at the end of a cycle.

Fig. 4c is a view similar to 4b but showing the mechanism in a position occupied immediately after the start of a new cycle of operation.

Fig. 4d is a view constituting a fragment of Fig. 4c with additional parts removed and broken away to illustrate a detail.

Fig. 4e is a view similar to Fig. 4b but showing a change of position preparatory to bringing the master cylinder of the duplicator to a master changing position with the master clamp open.

Fig. 4f is a view similar to Fig. 4e but showing the mechanism at a later point in the cycle.

Fig. 5 is a fragmentary enlarged elevational sectional view taken generally along a line 5—5 in Fig. 4.

Fig. 6 is a fragmentary enlarged elevational sectional view taken generally along a line 6—6 in Fig. 4.

Fig. 7 is a fragmentary enlarged elevational sectional view taken generally along a line 7—7 in Fig. 4.

Fig. 8 is a fragmentary enlarged right-hand elevational view of the duplicator with parts removed and broken away.

Fig. 9 is a fragmentary horizontal sectional view taken generally along a line 9—9 in Fig. 8.

Fig. 10 is a somewhat diagrammatic right-hand side elevational view of the duplicator with parts removed and broken away, the duplicator being shown with the master clamp closed and the operating mechanism therefor in its unactuated position.

Fig. 10a is a view similar to Fig. 10 but showing the master clamp and the operating mechanism therefor in their actuated positions, with the clamp open.

Fig. 11 is a fragmentary horizontal sectional view taken generally along a line 11—11 in Fig. 10.

Figure 1:
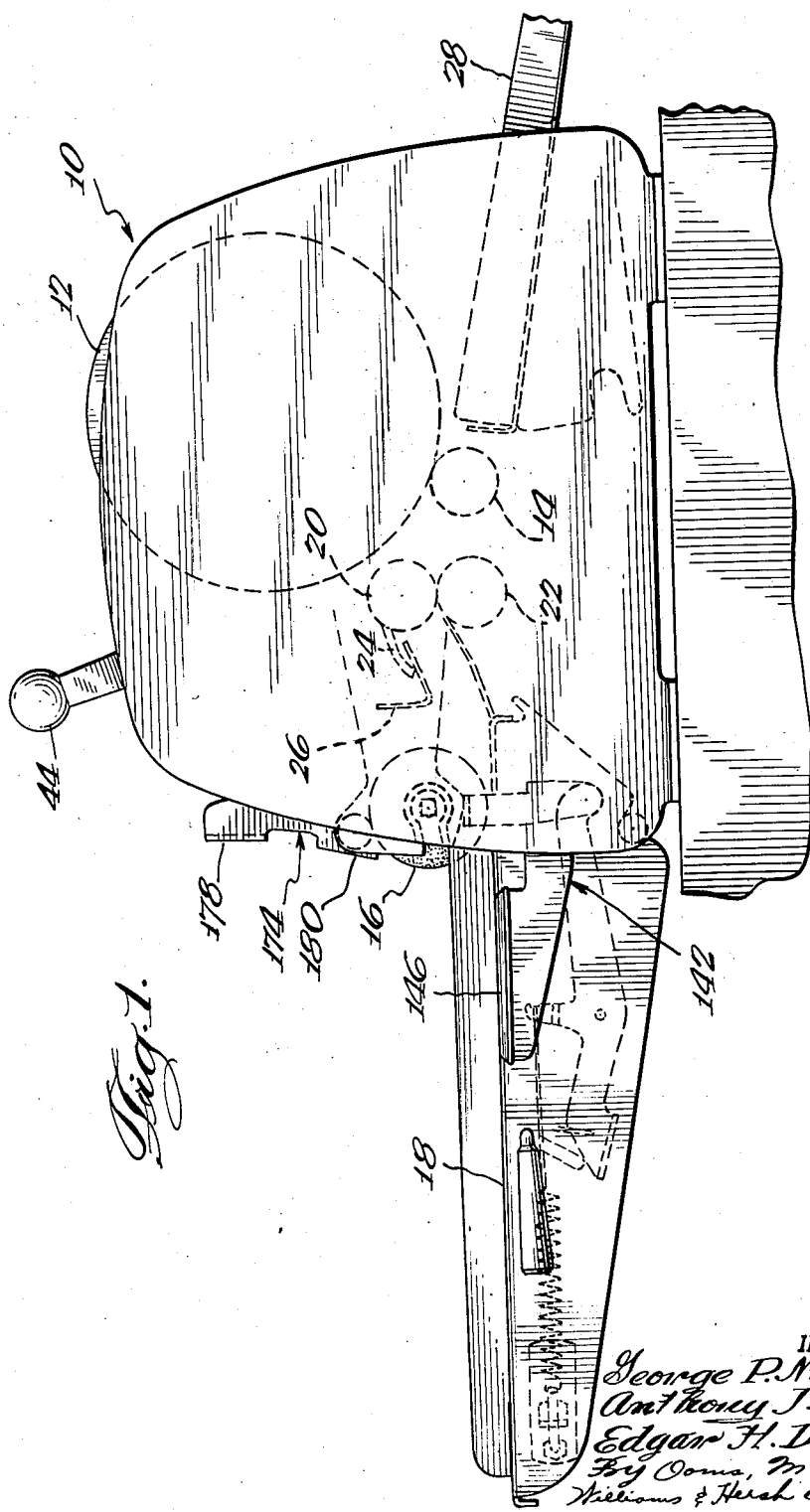
Fig. 1 is a right-hand side elevational view of a duplicator which will be described as an illustrative embodiment of the invention, the duplicator being equipped with a single cycle driving mechanism.

As already noted, the drawings illustrate a duplicator or printing machine 10 which may be of any desired type. Thus, it is merely by way of example that the illustrated duplicator 10 is of the liquid process type, having a master printing cylinder or drum 12, adapted to carry a master sheet bearing a reversely printed image. Moistened copy sheets are pressed against the master sheet so that a portion of the image will be transferred to each copy sheet. Thus, the duplicator 10 is provided with an impression roller 14 for pressing the copy sheets against the master cylinder 12. Feed rollers 16, or any other suitable feeding means, are provided to feed individual sheets from a stack held on a feed table 18. Each copy sheet is fed between upper and lower forwarding rollers 20 and 22 which serve to forward the copy sheets between the master cylinder 12 and the impression roller 14, the upper roller also serving as a moistening roller to moisten the sheet. The upper moistening roller 20 may be moistened in any suitable manner as by means of a wick or pad 24 which is partly immersed in moistening liquid contained in a suitable trough 26 or the like. The trough 26 may be supplied with liquid by means of an inverted bottle or any other suitable feeder (not shown). The printed copy sheets are discharged into a receiving tray 28.

Various means may be provided to secure the master sheet to the printing cylinder 12. In the illustrated construction, the cylinder 12 is provided with a longitudinal clamping bar 30 which is slidable inwardly and outwardly, in a general radial direction, in a slot 32 formed in the cylinder 12. The bar 30 has a lip 34 which is engageable with a stepped shoulder 36 on the cylinder 12 at one side of the slot 32. Thus, the leading edge of the master sheet may be clamped between the lip 34 and the shoulder 36. Springs 38 are employed to bias the clamping bar inwardly. The clamping bar 30 is adapted to be moved outwardly by means of a plurality of levers 40 mounted on a longitudinal shaft 42 which is pivoted in the cylinder 12.

The clamp 30 is adapted to be operated by a hand lever 44 which is swingable about a pivot 46 mounted on a stationary plate or other frame member 48, which is on the right-hand side of the duplicator 10. Various means might be provided for operating the clamp 30 in response to movement of the lever 44. In this case, the lower end of the lever 44 carries a roller 50 which is engageable with a generally crescent-shaped lever 52. It will be seen that the lever 52 is swingable about a pivot 54 mounted on the frame plate 48. A spring 56 biases the lever 52 against the roller 50. The lever 44, in turn, is thereby biased against a stop pin 58.

The lever 52 has a camming edge 60 which is movable into the path of a roller 62 mounted on one of the clamp operating levers 40. Normally, however, the lever 52 is out of the path of the roller 62. When the clamp 30 is to be opened, the lever 44 is swung downwardly to the broken line position shown in Fig. 10. The roller 50 swings the lever 52 in a counter-clockwise direction, into the path of the roller 62. The clamp 30 may then be opened by rotating the cylinder 12 until the roller 62 engages the camming edge 60 on the lever 52. In the clamp operating position of the lever 44, the roller 50 enters a detent notch 64 in the lever 52, with the result that the lever 44 is retained in the clamp opening position until it is returned manually to its normal position.

The cylinder 12 is driven by a single cycle driving mechanism 66, adapted to rotate the cylinder through a single revolution. The driving mechanism 66 may also be operated so as to rotate the cylinder continuously.

It will be understood that motive power for operating the cylinder 12 may be provided by an electric motor or the like (not shown). A V-belt 68 may be employed to connect the motor to a drive pulley 70. It will be seen in Fig. 5 that the illustrated pulley 70 is rotatably mounted on a suitable ball bearing unit 72 supported by a stationary stub shaft 74.

The drive pulley 70 is adapted to be selectively coupled to a pinion 76 by means of a combination clutch and brake unit 78. In the illustrated construction, the pinion 76 meshes with a gear 80 which is secured to the printing cylinder 12. More specifically, the gear 80 is secured to a shaft 82 which carries the printing cylinder 12.

The clutch and brake unit 78 comprises a clutch 84 and a brake 86. From Fig. 5, it will be seen that the clutch 84 comprises a driving plate or member 88 and a driven plate or member 90. In this case, the driving plate 88 is annular in form and has a laterally offset outer portion 92 which is secured to the drive pulley 70. Thus, the clutch member is spaced from one side of the drive pulley. The driven clutch plate 90 is generally disk-shaped and is secured to the pinion 76. It will be seen that the plate 90 extends outwardly between the driving clutch plate 88 and the pulley 70. Disks or other facing members 94 of friction material are mounted on the inside of the driving clutch plate 88 and are engageable with the driven clutch plate 90.

The pinion 76 is rotatable about the stationary stub shaft 74 and is slidable therealong so that the driven clutch plate 90 may be shifted axially out of engagement with the driving clutch plate 88. The driven clutch plate 90 is biased against the driving plate 88 by means of a coil spring 96 which is compressed between the drive pulley 70 and a disk member 98 which is rotatable with the pulley. A suitable thrust bearing 100 is interposed between the disk member 98 and the pinion 76.

As shown to best advantage in Fig. 5, the illustrated brake 86 comprises interengageable brake members 102 and 104. As illustrated, the brake member 102 takes the form of a disk which is secured to the pinion 76 and is rotatable and slidable therewith. The brake member 104 may be characterized as substantially stationary with respect to the rotation of the brake disk 102, but actually the brake member 104 is rotatable through a limited angle and is translatable axially. As illustrated, the member 104 takes the form of a plate which is movable against the brake disk 102. Friction disks 106 or other friction facings are mounted on the plate 104 for engagement with the disk 102.

A camming arrangement is provided for shifting the brake plate 104 in an axial direction against the brake disk 102, in response to limited rotation of the plate 104. From Figs. 4 and 7, it will be seen that the plate 104 is formed with a plurality of camming ears or ramps 108 which angle away from the plate 104, on the opposite side of the plate from the brake disk 102. The ramps 108 are adapted to cooperate with openings 109 formed in a stationary plate 111. When the plate 104 is in its retracted position, the ramps 108 are received in the openings 109, and the plate 104 is flat against the plate 111. When the brake plate 104 is rocked or rotated in a clockwise direction, as seen in Fig. 4, the ramps 108 ride up out of the openings 109 onto the face of the plate 111. Accordingly, the brake plate 104 is shifted away from the plate 111, into engagement with the brake disk 102. The movement of the plate 104 is sufficient to shift the brake disk 102 to the right, as seen in Fig. 5, with the result that the clutch disk 90 is moved out of engagement with the friction pads 94 on the clutch plate 88. Accordingly, the pinion 76 is stopped. This, of course, stops the cylinder 12.

When the brake plate 104 is retracted to its normal position, as shown in Fig. 5, the friction disks 106 are withdrawn from the brake disk 102, and the clutch disk 90 is permitted to return into engagement with the friction disks 94 on the clutch plate 88. This re-establishes the driving connection to the master cylinder 12.

The range of angular movement of the clutch plate 104 is limited by a stationary pin or other stop 110, which is engageable with an ear 112 on the plate 104. When the ear 112 is against the pin 110, the plate 104 is in its retracted position. A shoulder 114 is formed on the plate 104, on the opposite side of the pin 110 from the ear 112 to limit the extent to which the plate 104 may be rotated in a direction such as to advance the plate against the brake disk 102.

In the illustrated construction, the brake plate 104 is adapted to be operated by means of a pawl or push link 116 which is swingable about a pivot 118 connected to the plate 104. The plate 104 is biased to its retracted position, in which the brake is disengaged, by means of a tension spring 120 which is connected between the pawl 116 and a fixed pin or other anchor 122.

It will be noted that the spring 120 biases the brake plate 104 to the position in which the clutch 84 is engaged. In this position of the plate 104, the printing cylinder 12 is adapted to be driven by the drive pulley 70. Means are provided so that the cylinder 12 may be caused to stop after a single revolution, or may be rotated continuously, at the selection of the operator. In the illustrated arrangment, the cylinder 12 is adapted to be stopped by the movement of a lever 126 operable in response to rotation of the cylinder. As shown to best advantage in Fig. 4, the lever 126 is swingable about a pivot 128. A spring 130 biases the lever 126 against a stop pin 132. It will be seen that the lever 126 has a lower arm 134 with an ear or lug 136 thereon which is adapted to engage and actuate the control pawl 116 for the combination clutch and brake 78. The illustrated pawl 116 is formed with a shoulder or tooth 138, adapted to be engaged by one edge of the ear 136. A longitudinal edge 140 extends outwardly on the pawl 116 from the shoulder 138 below the ear 136.

In a manner to be described shortly, the lever 126 is adapted to be swung away from the stop 132 and against the shoulder 138 on the pawl 116. Further swinging movement of the lever 126 is then operative to move the pawl and thereby rotate the brake control plate 104 away from the stop 110 (Fig. 4b) so as to disengage the clutch 84 and engage the brake 86. This stops the cylinder 12. Since the movement of the lever 126 is responsive to rotation of the cylinder 12, the lever 126 comes to rest with the combination clutch and brake 78 in its cylinder-stopping position.

Before developing further the manner in which the lever 126 is swung so as to stop the cylinder 12, it will be helpful to describe the manner in which the operator is enabled to start the cylinder 12, either for continuous rotation or for rotation through a single revolution. To enable the operator to carry out this function, the machine is provided with a manually movable control member in the form of a lever 142 which is swingable about a pivot 144. The lever 142 has an arm 146 which extends horizontally adjacent the feed table 18 and is positioned for easy operation by the operator. If the operator pushes down the arm 146 momentarily, the cylinder 12 will be rotated through a single revolution. The cylinder 12 may be caused to rotate continuously by pulling the arm 146 upwardly. The arm 146 will remain in its upwardly swung position, but will return spontaneously from its downwardly displaced position.

In the illustrated arrangement, the lever 142 has an inner camming arm 148 adapted to operate a follower arm 150. It will be seen that the camming arm 148 has a low cam portion 152 with high cam portions 154 and 156 on opposite sides thereof. A roller 158 is mounted on the outer end of the follower arm 150 and is adapted to ride along the cam portions 152, 154 and 156. A biasing spring 159 is connected to the lever 150 to press the roller 158 against the cam 148. Thus, the control lever 142 is biased to a position in which the roller 158 engages the lowermost portion 152 of the cam 148. When the arm 146 is swung downwardly, the high cam portion 154 swings the follower arm 150 in a clockwise direction, as seen in Fig. 2. The biasing action of the spring 159 returns the lever 142 to its central or neutral position when the arm 146 is released.

Similarly, raising the arm 146 causes the high cam portion 156 to swing the follower arm 150 clockwise. However, in this case, the roller 158 lodges in a detent notch 160 which is formed in the high cam portion 156. Thus, the arm 146 stays in its raised position until it is pushed downwardly to disengage the detent notch 160 from the roller 158.

In the illustrated mechanism, the follower arm 150 is operative to disengage the clutch control pawl 116 from the operating lever 126, so that the spring 120 will be able to return the control plate 104 to the position in which the combination clutch and brake 78 is in its cylinder-driving position. As shown to best advantage in Figs. 2 and 4, the illustrated arm 150 is secured to the right-hand end of a rotatable shaft 162 which extends between the right- and left-hand sides of the machine. An arm 164 is secured to the left-hand end of the shaft 162. It will be seen that the arm 164 is adapted to operate a lever 166 which is freely pivoted about the shaft 162. Thus, the lever 166 is formed with an ear or flange 168 adapted to be engaged by the lower edge of the arm 164. A second ear 170 is provided on the lever 166 to engage the upper edge of the pawl 116. It will be seen from Fig. 4 that the spring 120 is connected to a short depending arm 172 on the pawl 116 and is adapted to bias the pawl 116 upwardly against the ear 170. The force of the spring 120 is thus transmitted to the lever 166, which in turn transmits it to the arm 164. When the control arm 146 is swung either upwardly or downwardly, the lever 166 swings the pawl 116 downwardly so as to move the shoulder 138 out of engagement with the ear 136 on the operating lever 126 (Fig. 4c). Thus, the lever 126 is disabled from stopping the cylinder 12. Accordingly, the cylinder 12 will rotate until the pawl 116 is allowed to return upwardly into the path of the lever 126, whereupon the cylinder will be stopped by the next clockwise swinging movement of the lever 126.

A pull wire 173 or the like may be connected to the lever 166 to provide for control of the machine by a foot pedal or other remote instrumentality (not shown).

The illustrated machine is arranged so that the cylinder 12 may be stopped in either of two positions, at the selection of the operator. One position is employed for relatively short master sheets, corresponding in this case to letter-size copy sheets of approximately 11-inch length. The other position is employed for relatively long master sheets, corresponding in this case to legal-size copy sheets of approximately 14-inch length. The 11-inch stopping position of the cylinder 12 is shown in Fig. 10a. In this position of the cylinder 12, the tail end of an 11-inch master will be free from the impression roller 14. In the 14-inch stopping position, the cylinder 12 is rotated farther in a counter-clockwise direction so that a 14-inch master will be free of the impression roller 14.

It will be noted that the master clamp 30 is fully accessible with the cylinder 12 in the 11-inch stopping position. On the other hand, the master clamp 30 is relatively inaccessible when the cylinder 12 is stopped in the 14-inch position. It is for this reason that it is highly desirable to stop the cylinder 12 in the 11-inch position when short master sheets are being employed. On the other hand, it is necessary to stop the cylinder in the more fully advanced 14-inch position when long master sheets are being utilized.

In order to enable the operator to make the selection between the 11 and 14-inch stopping positions, the illustrated machine is equipped with a movable selector member in the form of a lever 174 which is rockable about a pivot 176. The illustrated lever 174 has an upper arm 178 which is pressed inwardly to rock the lever to the 11-inch position. A lower arm 180 on the lever 174 is pushed inwardly to shift the lever to the 14-inch position.

The lever 174 controls a switch link or pawl 182 which is carried by the operating lever 126 and is adapted to be switched between either of two cam followers 184 and 186. Both of the cam followers 184 and 186 are operated by a cam 188 which is rotatable with the cylinder 12. The cam followers 184 and 186 are spaced apart angularly about the axis of the cam 188, so that the followers are operated in a differential phase relationship. In this case, the follower 186 lags behind the follower 184 in phase and hence is effective to stop the cylinder 12 at a later point in the cycle than is the follower 184. Accordingly, the follower 184 stops the cylinder 12 in the 11-inch position, while the follower 186 stops the cylinder in the 14-inch position.

The followers 184 and 186 are swingable about pivots 190 and 192 and are provided with rollers 194 and 196, adapted to engage the cam 188. Biasing springs 198 and 200 are connected to the followers 184 and 186 so as to press the rollers 194 and 196 against the cam 188. The followers 184 and 186 are formed with shoulders or teeth 202 and 204 adapted to operate the switch pawl 182.

It will be seen from Fig. 4 that the switch pawl 182 is swingable about a pivot 206 carried by an upwardly extending arm 208 on the lever 126. A pin 210 is mounted on the switch pawl 182 for engagement by either of the cam followers 184 and 186. Thus, the switch pawl 182 may be swung so that the pin 210 will be in the path of either the shoulder 202 on the follower 184, or the shoulder 204 on the follower 186.

A yieldable connection is provided between the selector lever 174 and the switch pawl 182 by means of a spring 212, which in this case merely comprises a length of spring wire, adapted to be flexed by the lever 174. Thus, one end of the spring wire 212 is looped around the pivot 176 for the lever 174. The other end portion of the spring wire 212 extends through an aperture 216 in an ear or flange 218 formed on the switch pawl 182. The spring wire 212 is slidable in the aperture 216 to provide for the oscillatory travel imparted to the pawl 182 by the cam followers 184 and 186. An intermediate portion of the spring wire 212 extends through an aperture 220 in an ear 222 formed on the selector lever 174. Thus, the spring wire 212 is flexed downwardly when the lever 174 is swung to the 11-inch position, and is flexed upwardly with the lever 174 in the 14-inch position. The spring 212 is thereby effective to swing the pawl 182 so that it will be in the path of the cam follower 184, in the 11-inch position, or the cam follower 186, in the 14-inch position.

A detent arrangement is provided to retain the lever 174 in either of its two positions. Thus, the lever 174 is provided with a detent portion 224 having detent notches 226 and 228, which are engageable by a pin 230 on a movable follower member in the form of a lever 232. A spring 234 is connected to the lever 232 to bias the pin 230 against the notched detent member 224.

As already noted, the master clamp 30 is fully accessible when the cylinder 12 is stopped in the 11-inch position. Provision is made for automatically stopping the cylinder 12 in this position whenever the clamp-operating lever 44 is operated to open the clap 30. Thus, operation of the clamp lever 44 will cause the cylinder 12 to stop in the 11-inch position, regardless of the position of the selector lever 174.

The overriding action of the clamp lever 44 is brought about by an arm 236 which is yieldably connected to the switch pawl 182 by means of a tension spring 238 which extends downwardly between the pawl 182 and the arm 236. A pin or other stop 240 is provided on the arm 236 and is normally biased against the lower edge of the pawl 182 by the spring 238.

As shown in Fig. 10, the arm 236 is secured to the left-hand end of a shaft 242 which extends between the left- and right-hand sides of the machine. An arm 244 is secured to the right-hand end of the shaft 242 and is provided with a pin 246 which is engageable by a cam or ramp 248 on the clamp-operating arm 44.

When the clamp-operating arm 44 is swung downwardly to open the master clamp 30, the arms 244 and 236 are also swung downwardly (Fig. 4e), with the result that the spring 238 is stretched sufficiently to overcome the force of the spring 212 and swing the pawl 182 to its 11-inch position (Fig. 4f), even if the lever 174 is in its 14-inch position. When the cylinder 12 again comes to rest, it will be stopped in its 11-inch position (Fig. 10a), with the master clamp 30 open and readily acessible to the operator so that a new master may be inserted.

It may be helpful to conclude by reviewing the operation of the duplicator 10. It will be assumed initially that the printing cylinder 12 is stopped and is equipped with a master sheet. The cylinder 12 may be caused to rotate through a single revolution by swinging the control arm 146 downwardly for a brief interval, and then permitting the arm 146 to return to its central position. The downward movement of the arm 146 causes the high cam portion 154 to swing the follower arm 150 clockwise, as seen in Figs. 2 and 8. This causes the arm 164 to swing the lever 166 downwardly (Fig. 4c). The ear 170 on the lever 166 pushes the pawl 116 downwardly so as to disengage the pawl from the lever 126. The spring 120 thereupon rotates the control plate 104 in a counter-clockwise direction, as seen in Fig. 4, until the movement of the plate is arrested by the stop pin 110.

Due to the action of the camming ears 108, the plate 104 is thereby retracted from the brake disk 102. Moreover, the assembly comprising the pinion 76, the clutch disk 90, and the brake disk 102 is allowed to slide axially under the biasing action of the spring 96 until the clutch disk 90 is engaged with the friction pads 94 on the clutch plate 88 carried by the drive pulley 70. The cylinder 12 is thereby set into rotation.

However, the cylinder 12 is stopped after a single revolution. It will be assumed that the selector lever 174 is in the 14-inch position, as shown in Fig. 4. With the lever 174 thus positioned, the wire spring 212 swings the switch pawl 182 in a counter-clockwise direction, into the path of the cam follower 186. The high part of the cam 188 swings the cam follower 186 against the pin 210 on the switch pawl 182 and thereby shifts the pawl to the right, as seen in Fig. 4b. Accordingly, the lever 126 is rotated clockwise. The ear 136 on the lever 126 engages the shoulder 138 on the pawl 116 and shifts the pawl to the left, so as to rotate the control plate 104 clockwise. This causes the camming ears or ramps 108 to ride up out of the openings 109 so as to advance the plate 104 to the right, as seen in Fig. 5. The friction disks 106 on the plate 104 engage the brake disk 102 and shift the assembly, comprising the pinion 76, the brake disk 102, and the clutch disk 90, so as to disengage the clutch disk 90 from the friction disks 94 on the clutch plate 88. This stops the cylinder 12 with the cam follower 186 on the high part of the cam 188. The cylinder 12 will remain stationary until the pawl 116 is again disengaged from the lever 126, by the action of the manually operable control arm 146. If the control arm 146 is swung upwardly, it will be retained in this position by the engagement of the roller 158 with the detent notch 160. Thus, the lever 166 will maintain the pawl 116 out of the path of the lever 126. The cam 188 will oscillate the lever 126 as the cylinder 12 is rotated, but the pawl 116 will not be actuated.

When the cylinder 12 is stopped in the 14-inch position, the master clamp 30 is displaced counter-clockwise, from the position shown in Fig. 10a, and is not conveniently accessible for changing the master sheet. However, the cylinder will automatically be moved to the 11-inch position if the master clamp operating lever 44 is swung downwardly, and the feed control arm 146 is then pushed downwardly. When the clamp operating lever 44 is swung downwardly, the crescent-shaped lever 52 is swung into the path of the clamp opening roller 62 on the cylinder 12. Thus, the clamp 30 will be open with the cylinder 12 in either the 11-inch or 14-inch position. In addition, the downward movement of the lever 44 swings the arms 244 and 236 downwardly, with the result that the spring 238 is stretched, as shown in Fig. 4e. When the cylinder 12 is set into rotation by operating the feed lever 142, the spring 238 will swing the switch pawl 182 to its 11-inch position, as shown in Fig. 4f. Thus, the spring 238 overcomes the force of the wire spring 212. The cylinder 12 will come to rest in the 11-inch position, with the master clamp 30 open and readily accessible, as shown in Fig. 10a.

For use with short master sheets, the selector lever 174 is moved to its 11-inch position by pushing inwardly on the upper arm 178. During the next cycle of operation, the wire spring 212 shifts the switch pawl 182 so that it will be operated by the 11-inch cam follower 184. The cylinder 12 will then stop in the 11-inch position.

It will be apparent that the present invention provides a driving mechanism whereby the duplicator may be operated either continuously or through successive single cycles of operation. The mechanism affords a selection between either of two stopping positions for the cylinder. The cylinder is automatically stopped in the more accessible of the two positions when the clamp operating lever is actuated. The mechanism is quiet and efficient and is adapted to rotate the master cylinder at a relatively high speed. The cylinder is stopped accurately in the proper position, but without excessive shock or wear on the working parts.

Various modifications, alternative constructions and equivalents may be employed without departing from the true spirit and scope of the invention as exemplified in the foregoing description and defined in the following claims.

We claim:

1. In a printing machine, the combination comprising a printing cylinder, a drive for rotating said printing cylinder, said drive including a combination clutch and brake means for starting and stopping said cylinder, said combination clutch and brake means including a pawl movable in first and second directions for actuating said clutch and brake means to first and second positions for starting and stopping said cylinder, yieldable means biasing said pawl to said first position, a cam rotatable with said cylinder, a swingable cam follower operable by said cam and having an arm engageable with said pawl for moving said pawl to said second position and thereby stopping said cylinder and said cam, and manually operable means for disengaging said pawl from said arm and thereby releasing said pawl for return movement to said first position, said clutch and brake means thereby being effective to rotate said cylinder until said manually operable means is released and said cam again moves said pawl to said second position.

2. In a printing machine, the combination comprising a printing cylinder, a drive for rotating said cylinder, said drive including a combination clutch and brake for starting and stopping said cylinder, said combination clutch and brake comprising a continuously rotatable driving clutch plate, an intermittently rotatable driven clutch plate movable into and out of engagement with said driving clutch plate, means biasing said driven clutch plate towards said driving clutch plate, a first intermittently rotatable brake plate rotatable with said driven clutch plate, said driven clutch plate being drivingly connected to said cylinder, a second brake plate movable against said first brake plate for stopping said cylinder, said second brake plate being rotatable through a limited range between first and second positions, cam means operative in response to movement of said second brake plate between said first and second positions for moving said second brake plate against said first brake plate and shifting said first brake plate and said driven clutch plate to disengage said driven clutch plate from said driving clutch plate, means biasing said second brake plate to said first position, a cam rotatable with said cylinder, a cam follower lever oscillable by said cam, a pawl pivotally connected to said second brake plate and engageable by said lever for shifting said second brake plate to said second position and thereby stopping said cylinder and said cam, and manually operable means for disengaging said pawl from said lever for releasing said second brake plate for movement to said first position and thereby causing said combination clutch and brake to rotate said cylinder until said manually operable means is released and said cam again shifts said second brake plate to said second position.

3. In a printing machine, the combination comprising a printing cylinder, a drive for rotating such cylinder, said drive including a combination clutch and brake for starting and stopping said cylinder, said combination clutch and brake comprising a pawl shiftable to first and second positions for actuating said combination clutch and brake to start and stop said cylinder, means yieldably biasing said pawl to said first position, a cam rotatable with said cylinder, first and second cam followers operable by said cam and spaced apart angularly for operation in a differential phase relationship, said second cam follower lagging said first cam follower in phase, a lever, a switch link pivotally mounted on said lever and selectively movable into the path of either of said first and second cam followers, said lever thereby being selectively operable by either of said cam followers, an arm on said lever engageable with said pawl for shifting said pawl to said second position and thereby stopping said cylinder and said cam, manually operable means for displacing said pawl laterally and thereby disengaging said pawl from said arm for releasing said pawl for movement to said first position and thereby causing said combination clutch and brake to rotate said cylinder until said manually operable means is released and said cam against shifts said pawl to said second position, a manually operable switch member movable selectively to first and second positions, yieldable means connected between said switch member and said switch link and operative in response to movement of said switch member to said first and second positions to move said switch link into the paths of said first and second cam followers, said cylinder having a clamp thereon for securing a master sheet thereto, a manually operable control element for opening and closing said clamp, and means operative in response to clamp opening movement of said control element for overriding said switch member and yieldably shifting said switch link into the path of said first cam follower.

4. In a printing machine, the combination comprising a printing cylinder, a drive for rotating said printing cylinder, said drive including combination clutch and brake means for starting and stopping said cylinder, said combination clutch and brake means including a pawl movable in first and second directions for actuating said clutch and brake means to first and second positions for starting and stopping said cylinder, means biasing said pawl to said first position, a cam rotatable with said cylinder, cam follower means operable by said cam and engageable with said pawl for moving said pawl to said second position and thereby stopping said cylinder and said cam, and manually operable means for disengaging said pawl from said cam follower means and thereby releasing said pawl for return movement to said first position, said clutch and brake means thereby being effective to rotate said cylinder until said manually operable means is released and said cam again moves said pawl to said second position.

5. In a printing machine, the combination comprising a printing cylinder, a drive for rotating such cylinder, said drive including a combination clutch and brake for starting and stopping said cylinder, said combination clutch and brake comprising a pawl shiftable to first and second positions for actuating said combination clutch and brake to start and stop said cylinder, means yieldably biasing said pawl to said first position, a cam rotatable with said cylinder, first and second cam followers operable by said cam and spaced apart angularly for operation in a differential phase relationship, said second cam follower lagging said first cam follower in phase, a lever, a switch link pivotally mounted on said lever and selectively movable into the path of either of said first and second cam followers, said lever thereby being selectively operable by either of said cam followers, an arm on said lever engageable with said pawl for shifting said pawl to said second position and thereby stopping said cylinder and said cam, manually operable means for displacing said pawl transversely and thereby disengaging said pawl from said arm to release said pawl for movement to said first position, said combination clutch and brake thereby causing said cylinder to rotate until said manually operable means is released and said cam again shifts said pawl to said second position, a manually operable switch member movable selectively to first and second positions, and yieldable means connected between said switch member and said switch link and operative in response to movement of said switch member to said first and second positions to move said switch link into the paths of said first and second cam followers.

6. In a printing machine, the combination comprising a printing cylinder, a drive for rotating such cylinder, said drive including a combination clutch and brake for starting and stopping said cylinder, said combination clutch and brake comprising a movable shift member for actuating said combination clutch and brake to start and stop said cylinder, means yieldably biasing said shift member to said first position, a cam rotatable with said cylinder, first and second cam followers operable by said cam and spaced apart angularly for operation in a differential phase relationship, said second cam follower lagging said first cam follower in phase, a switch link selectively shiftable into the path of either of said first and second cam followers, manually operable means for shifting said link, a movable linkage operable by said switch link and engageable with said shift member to move said shift member to said second position to stop said cylinder, and manually operable means for disengaging said shift member from said linkage and thereby releasing said shift member for movement to said first position for causing said combination clutch and brake to rotate said cylinder until said manually operable means is released and said cam again moves said shift member to said second position.

7. In a printing machine, the combination comprising a printing cylinder, a drive for rotating said cylinder, said drive including a combination clutch and brake for starting and stopping said cylinder, said combination clutch and brake comprising a continuously rotatable driving clutch member, an intermittently rotatable driven clutch member shiftable into and out of engagement with said driving clutch member, means biasing said driven clutch member toward said driving clutch plate, a first brake member rotatable and shiftable with said driven clutch member, said driven clutch member being drivingly connected to said cylinder, a second brake member movable against the said first brake member for stopping said cylinder, shifter means for moving said second brake member against said first brake member and shifting said first brake member and said driven clutch member to disengage said driven clutch member from said driving clutch member, a cam rotatable with said cylinder, cam follower means operable by said cam, a linkage movable by said cam follower means and engageable with said shifter means to move said shifter means in a direction to stop said cylinder, and manually operable means for disengaging said shifter means from said linkage and thereby releasing said shifter means for movement in a direction to cause said combination clutch and brake to rotate said cylinder until said manually operable means is released and said cam again moves said shifter means to stop said cylinder.

8. In a printing machine, the combination comprising a printing cylinder, a drive for rotating said cylinder, said drive including clutch and brake means for starting and stopping said cylinder, a cam operable by said cylinder, first and second cam followers operable by said cam in a differential phase relationship, a switch member shiftable between said first and second cam followers, a movable selector member, yieldable means connected between said selector member and said switch member for shifting said switch member between said cam followers, selectively operable linkage means for connecting and disconnecting said clutch and brake means to and from said switch member for stopping and starting said cylinder, said cylinder being adapted to be stopped selectively in either of two different positions by shifting said switch member between said cam followers, a device on said cylinder for securing a printing sheet thereto, a selectively operable control element for operating said device between securing and releasing positions, and means responsive to movement of said control element to the device-releasing position for exerting sufficient force on said switch member to overcome said yieldable means and shift said switch member to said first cam follower regardless of the positions of said selector member, said control element thereby conditioning said switch member and said linkage means to stop said cylinder in one of said two positions regardless of the position of said selector member, said movable selector member having means for detaining said selector member against change of position by the reaction of said yieldable means upon being overcome by operation of said control element.

References Cited in the file of this patent
UNITED STATES PATENTS

| | | |
|---|---|---|
| 2,629,322 | Levin | Feb. 24, 1953 |
| 2,645,174 | Levin | July 14, 1953 |
| 2,812,047 | Smitzer | Nov. 5, 1957 |